Feb. 8, 1955  R. E. RISLEY ET AL  2,701,730
REINFORCED LARGE DIAMETER HIGH-PRESSURE PIPE COUPLING
Filed May 25, 1948  6 Sheets-Sheet 4
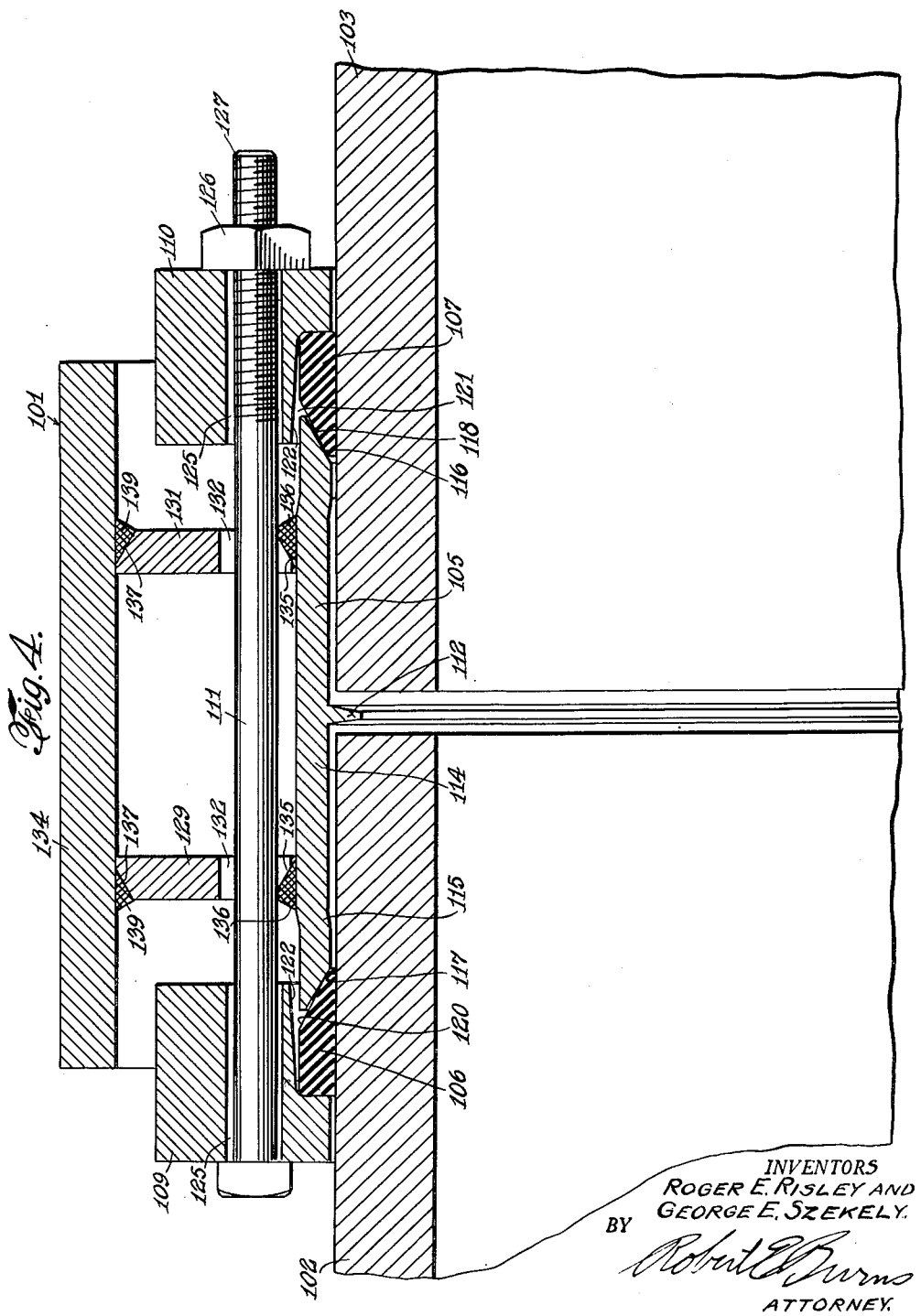
INVENTORS
ROGER E. RISLEY AND
GEORGE E. SZEKELY.
BY
ATTORNEY.

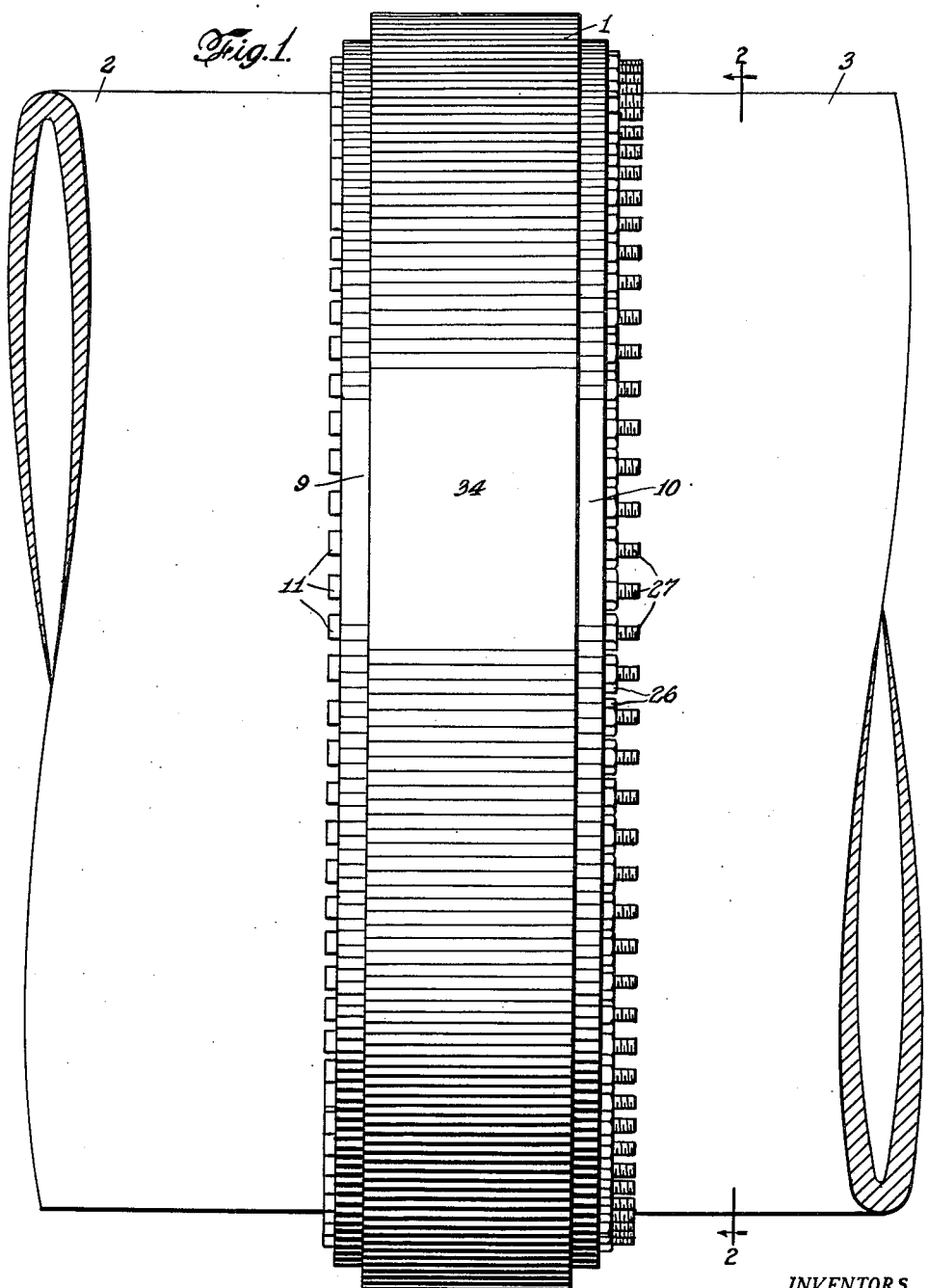

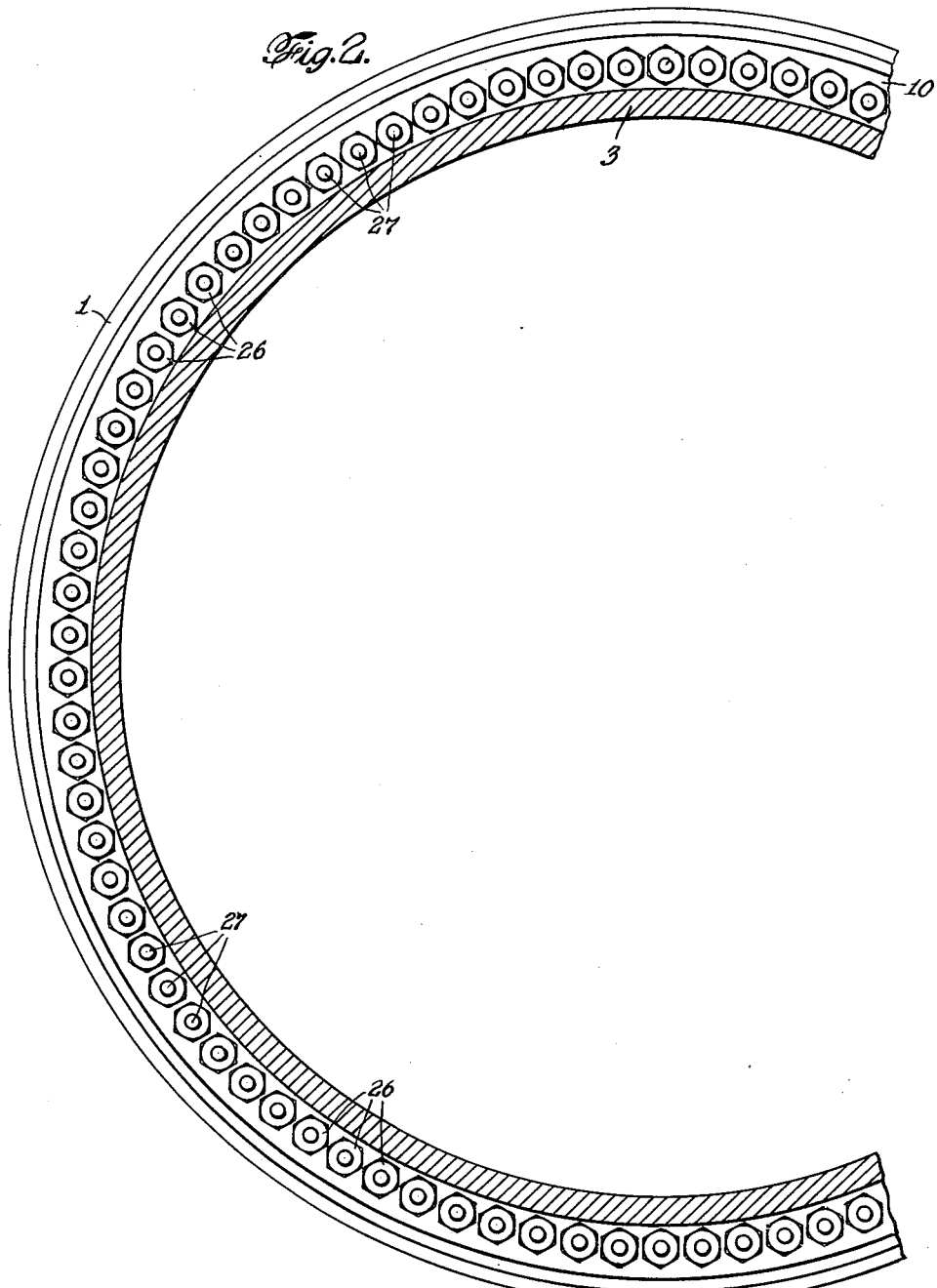

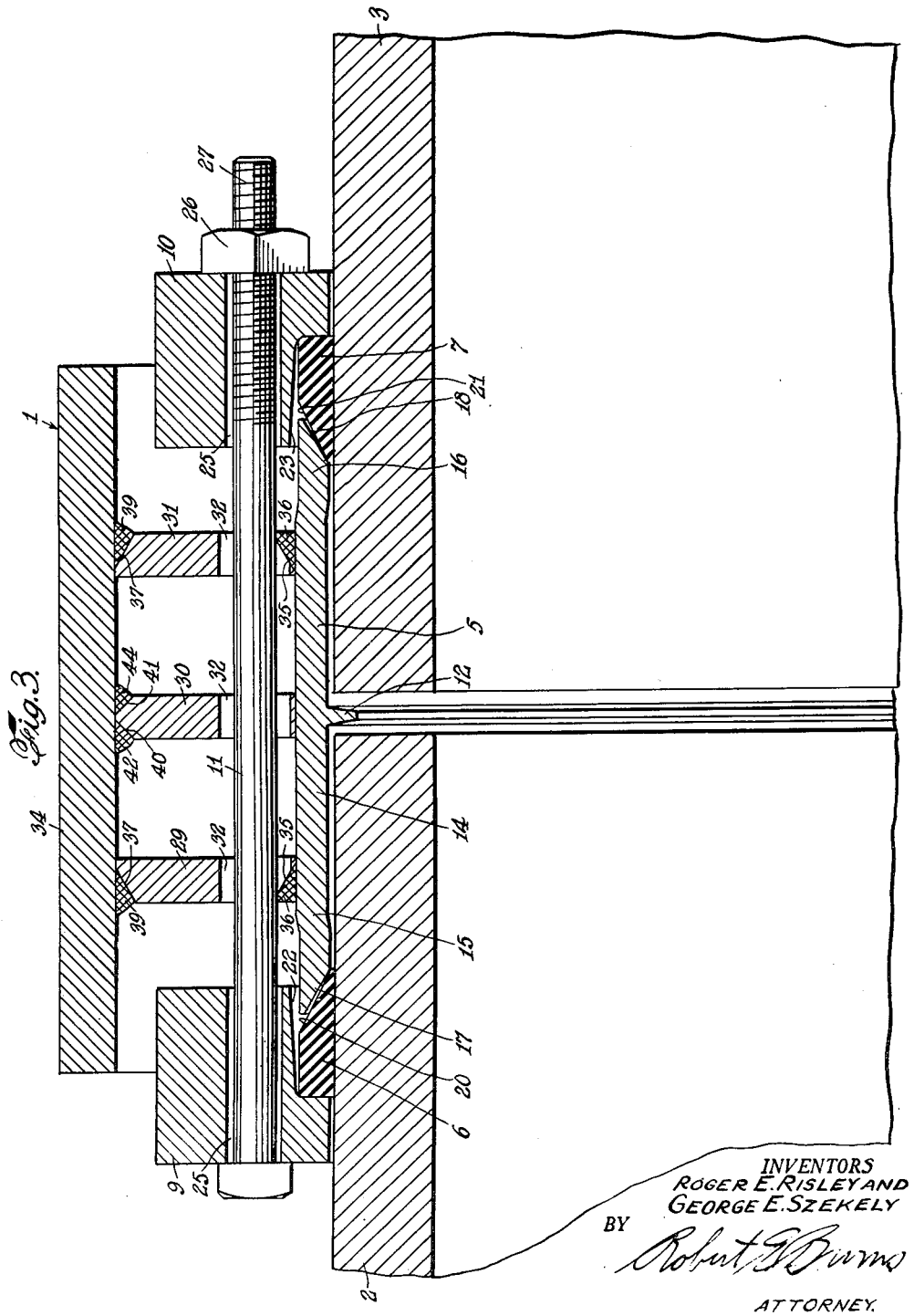

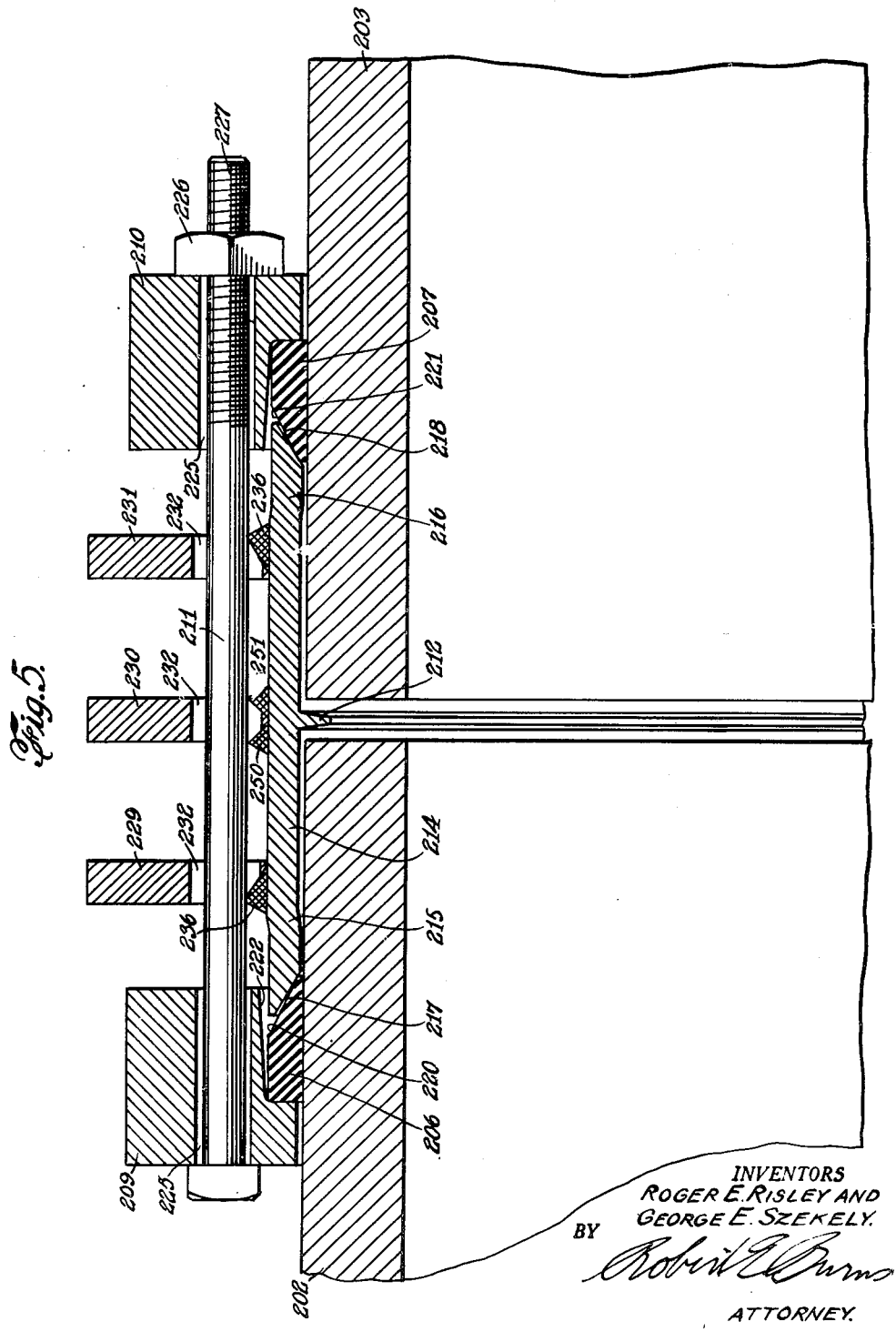

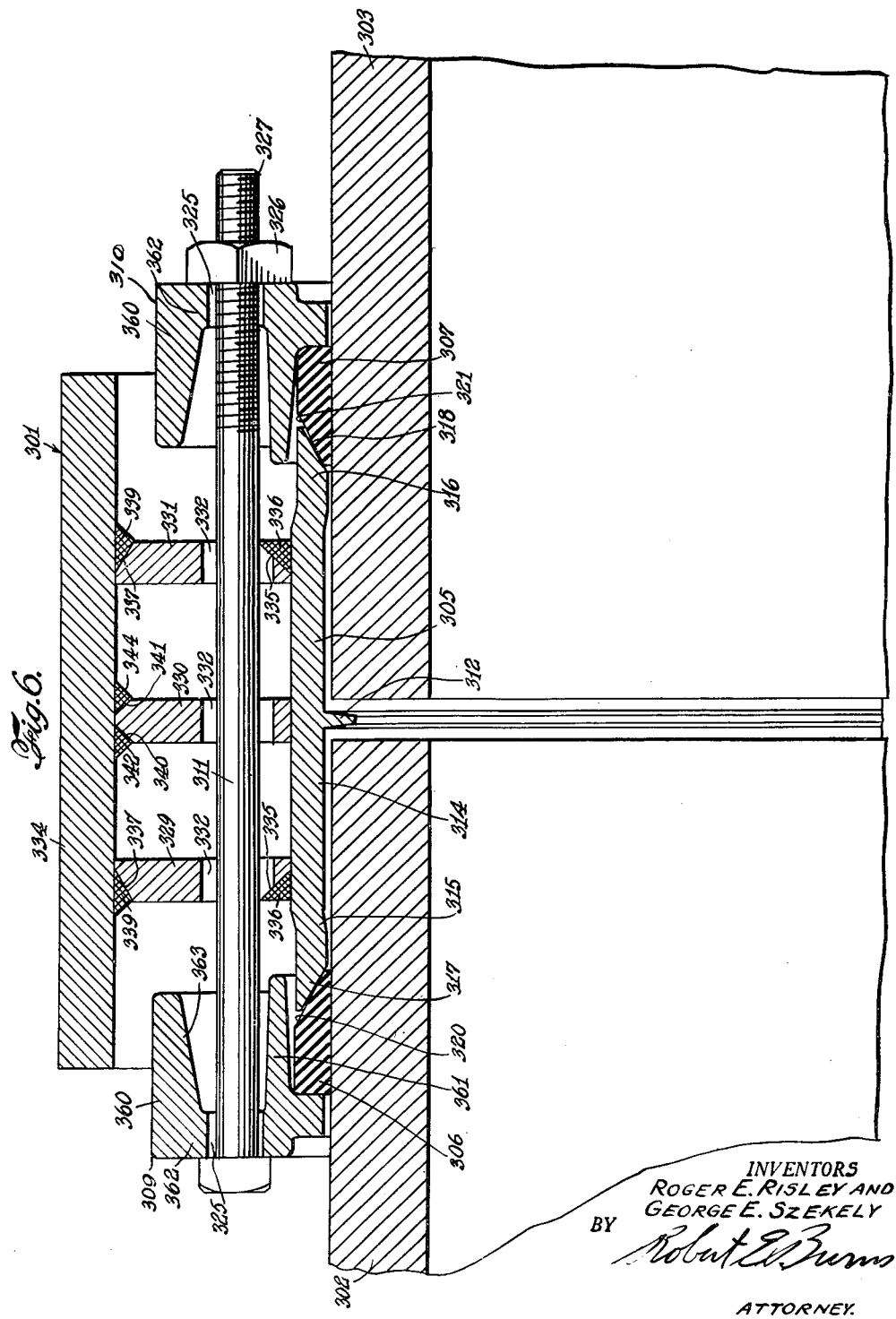

United States Patent Office 2,701,730
Patented Feb. 8, 1955

2,701,730

REINFORCED LARGE DIAMETER HIGH-PRESSURE PIPE COUPLING

Roger E. Risley and George E. Szekely, Bradford, Pa., assignors to Dresser Industries, Inc., Cleveland, Ohio, a corporation of Pennsylvania Application May 25, 1948, Serial No. 29,104

10 Claims. (Cl. 285—132)

The present invention relates to piping and particularly to an improved coupling suitable for use on pipes of large diameter such as penstocks.

Penstocks are often placed on steep slopes and operated under an exceptionally high-pressure head. The penstocks is generally of heavy construction and large in size, for example, it may be made of steel plate one and one-quarter inches in thickness, its diameter often being as great as seventy-two inches or more. By reason of the large size and great strength required in the couplings for the penstocks their construction has been expensive and generally unsatisfactory. However, heretofore, many forms of couplings have been provided suitable for pipes of smaller sizes and/or lower pressure requirements than the large penstocks. Such couplings have included middle rings or sleeve members and various follower and packing ring and gasket arrangements. A coupling which has been found satisfactory in many instances for use with pipes of small diameter is disclosed in Dresser Patent No. 884,371. This coupling comprises a middle ring or sleeve member provided at each end with a packing recess, packing rings for engaging said recesses, a pair of metal followers or clamping rings for engaging the packings and forcing them into engagement between the wall of the pipe section and the packing recesses of the middle ring, and bolts for drawing the clamping rings toward the middle ring. These bolts are inserted through registering apertures in the clamping rings. It is necessary that the clamping rings have portions extending outside of the periphery of the packing recesses to provide the bolt holes or apertures. Thus, in this construction the bolt strain is exerted at a considerable distance radially from the outer surface of the pipe sections and imposes a severe turning or rolling moment on the clamping ring which therefore must be made of strong construction.

In making up couplings of this type for pipes of large diameter such as penstocks it has been found impractical to make the sleeve member of the desired thickness to provide adequate strength in the coupling. In making the sleeve member thicker, the bolt circle diameter must be increased resulting in a still greater moment tending to turn or roll the follower rings outwardly from the wall of the pipe, thus also necessitating the use of considerably heavier follower rings. Further, unless expensive machining or forming is performed on the sleeve member, it is necessary to make the radial thickness of the packing ring or gasket substantially equal to the radial thickness of the sleeve member. In this case, the unit pressure on the packing ring for a given total number of bolts and size of bolts would be decreased in proportion to the increase in annular area of the pressure surface. Increasing the size and/or number of bolts to raise the unit pressure on the packing ring would still further increase the turning moment on the follower rings and thereby make an even heavier construction necessary.

The present invention aims to overcome the foregoing difficulties and disadvantages by providing an improved coupling for use on pipes of large diameter for high-pressure use in which the coupling is comparatively light in weight.

Another object of the invention is to provide an improved coupling which is simple and economical to manufacture, efficient in operation and durable in use.

In the preferred form of the invention, a coupling is provided in which a sleeve member of conventional thickness is used. The sleeve member is encircled by a plurality of annular members. In one form of the invention the annular members are secured at their outer edges by a tubular member while in other forms of the invention for use under reduced pressure, the tubular member may be omitted. Various follower rings may be used with these constructions to provide a leak-proof joint.

The constructions in accordance with the invention are advantageous in that the bolt circle diameters may be kept small resulting in a small moment tending to roll the follower ring. The radial dimension of the gasket may be kept small with a resulting high unit pressure thereon with the use of a small number of bolts. Further, standard middle rings may be used resulting in lower production costs.

Other objects and advantages of the invention will be apparent from the following description and from the drawings which show, by way of examples, embodiments of the invention.

In the drawings:

Fig. 1 is a side view of a coupling in place on a pipe of large diameter.

Fig. 2 is an end view of the coupling taken along the line 2—2 of Fig. 1.

Fig. 3 is a fragmentary vertical sectional view of the coupling in place on a pipe of large diameter.

Fig. 4 is a view corresponding to Fig. 3 of a modified coupling in accordance with the invention.

Fig. 5 is a view corrsponding to Fig. 3 of another modified coupling in accordance with the invention.

Fig. 6 is a view of the coupling shown in Fig. 3 with a modified form of follower.

Referring to the drawings, there is shown in Fig. 1 a pipe coupling 1 in accordance with the invention attached in place to connect large diameter pipes 2 and 3 which may be sections of a penstock. As may be seen in detail in Fig. 3, the coupling 1 comprises a middle ring or sleeve 5, a pair of packing rings or gaskets 6 and 7, a pair of end rings or follower rings 9 and 10. The parts of the coupling are held together over the joint by clamping bolts 11.

The middle ring or sleeve 5 is tubular in shape and has an inwardly projecting annular portion 12 adapted to abut against the ends of the pipes 2 and 3 to center it over the joint therebetween. Midsection 14 of the sleeve 5 is made with a slightly larger diameter than outer ends 15 and 16 so as to provide for play in the pipes in the event they are not exactly aligned. In order to provide recesses for the packing rings or gaskets 6 and 7, the outer ends 15 and 16 of the middle ring 5 are beveled outwardly as indicated at 17 and 18.

The packing rings or gaskets 6 and 7 are made of a material such as rubber or other suitable material and are preferably formed with one side thereof with surfaces 20 and 21 beveled to conform to the shape of the beveled surfaces 17 and 18 of the middle ring.

The follower rings 9 and 10 may be machined from a solid ring, with a portion of the inner surface machined away to provide recesses 22 and 23 to receive the gaskets 6 and 7. Each of the follower rings is apertured as indicated at 25, the apertures in each of the pair of rings registering in alignment for the insertion of the clamping bolts 11. Nuts 26 are attached to threaded ends 27 of the bolts 11 to draw the coupling unit together.

In accordance with the preferred form of the invention, annular rings 29, 30 and 31 are placed about the middle ring 5 and are preferably equally spaced. The rings 29 and 31 being spaced inwardly from the outer ends 15 and 16 of the middle ring 5 to provide clearance for the inward movement of the follower rings 9 and 10 as they are clamped by the bolts 11. All the rings are apertured in alignment as indicated at 32 for the insertion of the bolts 11.

A tubular member 34 having its inner diameter equal to the outer diameter of the annular rings 29, 30 and 31 is positioned about the rings. The tubular member 34 may have any desired length although it is preferred that its length be such that its ends extend at least partially over the follower rings 9 and 10. In order to provide for the attachment the annular rings 29 and 31 in position on the middle ring or sleeve 5, the inner edges of the rings are beveled as indicated at 35 to provide a recess for the welding material 36. The outer surfaces of the annular rings 29 and 31 are beveled as indicated at 37 in order to facilitate the making of welds 39. The center ring 30 is not attached to the middle ring 5 but is beveled on each side of its outer surface as indicated at 40 and 41 to provide recesses for its welded engagement with the tubular member 34 by the welds 42 and 44. Obviously, other suitable constructions might be used for attaching the annular rings 29, 30 and 31 to the middle ring 5 such as by using a press-fit engagement with the outer surface of the middle ring. Likewise, the tubular member 34 may be alternatively secured to the annular rings 29, 30 and 31 by bolts, rivets or other suitable means.

In installing the coupling 1 on the pipes 2, the coupling may be preassembled before positioning it about the ends of the pipe sections. The gaskets 6 and 7 are placed in position adjacent the ends of the sleeve 5, the follower rings 9 and 10 assembled in position against the gaskets and held in place by the bolts 11 and the nuts 26. The pipes 1 and 2 may then be stabbed into place in the coupling 1 and the nuts 26 tightened to complete the installation of the coupling.

Another embodiment of the invention is illustrated in Fig. 4 in which corresponding parts are designated by the same reference numerals as in Figs. 1–3 with the addition of 100. In Fig. 4, there is shown a coupling 101 which differs principally from that shown in the previous figures in that only two annular rings 129 and 131 are positioned about the sleeve or middle ring 105. This coupling is lighter in weight than the coupling previously described and is adaptable for connecting pipe sections or penstocks for use under lesser pressures than the coupling 1.

In Fig. 5, another embodiment of the invention is illustrated in which corresponding parts are designated by the same reference numerals as in Figs. 1–3 with the addition of 200. The coupling 201 differs from the coupling shown in Figs. 1–3 in that the outer tubular member is omitted and the annular ring 230 is beveled on its inner surface as indicated at 250 and 251 to provide recesses for welds 254 and 255 engaging with the outer surface of the middle ring 205. This coupling is suitable on pipe of lesser pressure than the couplings heretofore described and is advantageous for such use in that it is somewhat lighter in weight and smaller in overall diameter.

In Fig. 6, another embodiment of the invention is illustrated in which corresponding parts are designated by the same reference numerals as in Figs. 1–3 with the addition of 300. The coupling 301 differs from the couplings heretofore disclosed in that the end or follower rings 309 and 310 are adapted to be made from a suitable bar section rolled and welded to form the follower ring. As may be seen in Fig. 6, the follower ring is formed with an outer edge 360 of thicker radial dimension than the inner edge 361. The inner side of the edge 360 is tapered outwardly from its end wall 362, the taper being indicated at 363. This follower ring is advantageous in that it may be made from considerably less material. In the case of a small number of couplings, this would not make an appreciable saving. However, when a large number of couplings are involved, the saving of material amounts to many tons a year. Further, the structure is lighter in weight so that the coupling is easier to handle and less expensive to ship. In making the follower ring of bar stock, the bolt holes or apertures 325 may be punched in the stock and, even if the bar stock is to be drilled, the amount of drilling required is appreciably less than in the case of the drilling of the solid follower rings heretofore described. Moreover, the ring from the bar stock may be formed with less machining than when made from the solid ring stock. The bar stock for the follower rings 309 and 310 may be rolled to the desired cross section to provide the gasket recess and the machining, if any, would be only a finishing operation. Another advantage of the use of the rolled bar stock for rings of comparatively large diameter rather than machined couplings is that it is possible to provide a follower of the optimum cross-sectional dimensions for maximum strength with a minimum of material at the lowest possible fabricating expense which is an important consideration where substantial quantities are involved.

While the invention has been illustrated and described with reference to specific embodiments thereof, it will be understood that other embodiments may be resorted to without departing from the invention. For example, the sleeve member may be adapted to be welded or otherwise secured at one end to the end of a straight walled pipe. In other instances, the coupling may be used without the tubular member, and the spaced annular members may be made of various outer diameters. Further, in alternative constructions, the outer edge of the annular members may be of T, "bulb," or other suitable cross-sectional shapes. Therefore, the form of the invention set out above should be considered as illustrative and not as limiting the scope of the following claims.

We claim:

1. A pipe coupling for large diameter pipe comprising, a sleeve member, a gasket at least at one end of the sleeve member, a gasket follower to hold the gasket in position between the sleeve member and the pipe, bolt means to urge the gasket follower against the gasket, a plurality of apertured spaced annular flange members encircling the sleeve member and bearing thereon, and a tubular member encircling the flange members and being secured thereto, said bolt means passing through said apertured flange members.

2. A pipe coupling for large diameter pipe comprising, a sleeve member having an outwardly beveled inner surface at an end thereof to form a gasket recess with the wall of the pipe, a gasket having a portion adapted to fit into the gasket recess, an apertured follower to hold the gasket in sealing relationship between the sleeve member and the wall of the pipe, a plurality of bolt members extending through the apertures in the follower to urge the follower against the gasket, a plurality of apertured spaced annular members encircling the sleeve member and spaced inwardly from the ends thereof, said annular members bearing on said sleeve member and at least some of said annular members being secured thereto, said bolt members passing through said apertured annular members, and a tubular member encircling the annular members and being secured thereto.

3. A pipe coupling for large diameter pipe comprising, a sleeve member having outwardly beveled inner surfaces at each end thereof to form gasket recesses with the wall of the pipe with which it is to be used, a pair of gaskets each having a portion adapted to fit into its gasket recess, a pair of annularly-shaped apertured gasket followers to hold the gaskets in sealing relationship with the sleeve member and with the wall of the pipe, a plurality of bolt members extending through the apertures in the followers to urge the followers against the gaskets, a plurality of apertured spaced annular members encircling the sleeve member and spaced inwardly from the ends thereof, said annular members bearing on said sleeve member and at least some of said annular members being secured to said sleeve member, the bolt members extending through the apertures therein, and a tubular member encircling the annular members and being secured thereto.

4. A pipe coupling for large diameter pipe comprising, a sleeve member of slightly larger diameter than the pipe with which it is to be used, the sleeve member having outwardly beveled inner surfaces at each end thereof to form packing recesses between the sleeve member and the wall of the pipe, a pair of packing rings each adapted to be compressed into one of the packing recesses, a pair of apertured follower rings each adapted to urge one of the packing rings into its recess, the apertures of one ring registering with the apertures of the other ring, clamping bolts and nuts therefor, the bolts adapted to extend through the apertures of the follower rings to clamp the follower rings together to compress the gasket rings into position in sealing relationship with the sleeve member and the wall of the pipe, a plurality of apertured spaced annular members encircling and bearing on the sleeve member, at least some of said annular members being secured to said sleeve member, the outermost annular members positioned sufficiently inwardly from the ends of the sleeve member to permit clearance for the follower rings, said bolts passing through said apertured annular members and a tubular member encircling and bearing on the outer edges of the annular members and being secured thereto.

5. A pipe coupling for large diameter pipe comprising an integral flexible sleeve, a plurality of spaced apertured annular members encircling and bearing on said sleeve, a tubular member encircling and bearing on the outer edges of said annular members, the outermost annular members engaging the sleeve at some distance from its ends so as to provide a rigid middle sleeve portion and free elastic sleeve ends, said sleeve ends having receding inner surfaces forming annular packing recesses between the sleeve and the pipe wall, a pair of packing rings adapted to be placed and compressed into said recesses thereby urging said elastic sleeve ends radially outwards, a pair of follower rings engaging said packing rings, and clamping means for urging said follower rings against said packing rings, said clamping means passing through said apertured annular members.

6. A pipe coupling for large diameter pipe comprising a tubular sleeve, a gasket at least at one end of said sleeve, a gasket follower for holding the gasket in position between the sleeve and the pipe, bolt means for urging the gasket follower against the gasket, said sleeve being of relatively small axial width compared with its diameter and being elastically deformable upon compression of the gasket by the gasket follower, a plurality of apertured spaced annular members encircling the sleeve and bearing thereon, said members being spaced inwardly from said sleeve end to permit elastic deformation of said end when the gasket is pressed thereagainst but preventing deformation of the central portion of the sleeve, said bolt means passing through said apertured annular members, and a tubular member encircling said apertured annular members and being secured thereto.

7. A pipe coupling for large diameter pipe comprising a tubular sleeve, a gasket at least at one end of said sleeve, a gasket follower for holding the gasket in position between the sleeve and the pipe, bolt means for urging the gasket follower against the gasket, said sleeve being of relatively small axial width compared with its diameter and being elastically deformable upon compression of the gasket by the gasket follower, an apertured annular flange member encircling the sleeve and bearing thereon, said member being spaced inwardly from said sleeve end to permit elastic deformation of said end when the gasket is pressed thereagainst but preventing deformation of the central portion of the sleeve, said bolt means passing through said apertured flange member and a tubular member encircling the flange member and secured to the outer periphery thereof.

8. A pipe coupling for large diameter pipe comprising a tubular sleeve of slightly larger diameter than the pipe with which it is to be used, the sleeve having outwardly-bevelled inner surfaces at each end thereof defining packing recesses between the sleeve and the outer surface of the wall of the pipe, a pair of packing rings each adapted to be compressed into one of the packing recesses, a pair of apertured follower rings each adapted to urge one of the packing rings into its recess, the apertures of one ring registering with the apertures of the other ring, clamping bolts and nuts therefor, said bolts being adapted to extend through the apertures of the follower rings to draw the follower rings toward one another to compress the gasket rings into position in sealing relationship with the sleeve and the wall of the pipe, said sleeve being of relatively small axial width compared with its diameter and being elastically deformable upon compression of the packing rings by the follower rings, a plurality of apertured spaced annular members fixedly secured about the sleeve and bearing thereon, the outermost of said members being spaced inwardly from said sleeve ends to permit elastic deformation of said ends when the gasket is pressed thereagainst but preventing deformation of the central portion of the sleeve, said bolts passing through said apertured annular members, and a tubular member encircling the annular members and being in contact therewith to bear thereon.

9. A pipe coupling for large diameter thick-walled high pressure pipe comprising a rigid ring structure composed of a tubular sleeve of lesser wall thickness than the pipe, a gasket at least at one end of said sleeve and having approximately the same radial thickness as the latter, an apertured follower ring to press said gasket into sealing engagement with said sleeve and the wall of a pipe inserted therein, a plurality of bolt members extending through the apertures in said follower ring to urge the latter against said gasket, said sleeve being of relatively small axial width compared with its diameter and being elastically deformable upon compression of the gaskets by the gasket follower, a plurality of apertured spaced annular members encircling the sleeve and bearing thereon, the bolt members passing close to said sleeve through the apertures in the annular members, said members being spaced inwardly from said sleeve end to permit elastic deformation of said end when the gasket is pressed thereagainst but preventing deformation of the central portion of the sleeve, and a tubular member surrounding said annular members and being secured to the outer periphery thereof.

10. A pipe coupling for large diameter pipe comprising a tubular sleeve, a gasket at least at one end of said sleeve, a gasket follower for holding the gasket in position between the sleeve and the pipe, means for urging the gasket follower against the gasket, said sleeve being of relatively small axial width compared with its diameter and being elastically deformable upon compression of the gasket by the gasket follower, an annular member encircling and radially spaced from said sleeve end, and apertured radial stress transmitting means disposed between said sleeve and said annular member and secured to said annular member and to said sleeve and bearing thereon, said means for urging the gasket follower against the gasket passing through said apertured radial stress transmitting means.

References Cited in the file of this patent

UNITED STATES PATENTS

| | | |
|---|---|---|
| 1,189,147 | McCloy | June 27, 1916 |
| 1,493,269 | Kruesi | May 6, 1924 |
| 1,888,260 | Clark | Nov. 22, 1932 |
| 1,926,422 | Armbruster | Sept. 12, 1933 |
| 2,009,744 | Pfefferle | July 30, 1935 |
| 2,247,032 | Norton | June 24, 1941 |
| 2,445,151 | Newell | July 13, 1948 |